(12) United States Patent
Amano

(10) Patent No.: US 7,550,714 B2
(45) Date of Patent: Jun. 23, 2009

(54) IMAGE READING DEVICE

(75) Inventor: Toshio Amano, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/666,643

(22) PCT Filed: Oct. 28, 2005

(86) PCT No.: PCT/JP2005/019876

§ 371 (c)(1),
(2), (4) Date: Apr. 30, 2007

(87) PCT Pub. No.: WO2006/049094

PCT Pub. Date: May 11, 2006

(65) Prior Publication Data

US 2008/0121783 A1 May 29, 2008

(30) Foreign Application Priority Data

Nov. 2, 2004 (JP) ............................. 2004-319242

(51) Int. Cl.
*G01N 21/86* (2006.01)
(52) U.S. Cl. ................. 250/239; 358/513; 358/471
(58) Field of Classification Search ............ 250/239; 358/400, 500, 513, 471
See application file for complete search history.

(56) References Cited

U.S. PATENT DOCUMENTS

| | | | | |
|---|---|---|---|---|
| 5,955,733 A | * | 9/1999 | Orava et al. | 250/370.08 |
| 6,493,033 B1 | * | 12/2002 | Glogan et al. | 348/375 |
| 2002/0006236 A1 | * | 1/2002 | Schulman | 382/312 |
| 2005/0253053 A1 | * | 11/2005 | Chalyan et al. | 250/231.14 |
| 2006/0081763 A1 | | 4/2006 | Sawada | |

FOREIGN PATENT DOCUMENTS

| | | |
|---|---|---|
| JP | 6-217078 | 8/1994 |
| JP | 2004-193773 | 7/2004 |

OTHER PUBLICATIONS

International Search Report from corresponding PCT/JP2005/019876, mailed Jan. 17, 2006.

* cited by examiner

*Primary Examiner*—Stephen Yam
(74) *Attorney, Agent, or Firm*—Hamre, Schumann, Mueller & Larson, P.C.

(57) ABSTRACT

An image reader (A) includes a conductive case (1), a substrate (3) and a plurality of light receiving elements. The image reader (A) further includes a first electrode (10) formed at the case (1) and a second electrode (11) formed on the substrate (3). The case (1) is formed with an accommodation recess (1g), in which a conductive contact member (20) is provided. The conductive contact member (20) is held in contact with the first electrode (10) and the second electrode (11) to electrically connect the two electrodes to each other while separating the first electrode (10) and the second electrode (11) from each other.

9 Claims, 6 Drawing Sheets

IMAGE READING DEVICE

TECHNICAL FIELD

The present invention relates to an image reader. More particularly, the invention relates to a device to be incorporated in a facsimile machine or a scanner as a structural part for reading an image of a document.

BACKGROUND ART

Generally, an image reader includes a case made of a synthetic resin and certain parts mounted in the case (See JP No. 2004-193773, for example). An example of conventional image reader is shown in FIGS. 7 and 8.

Main structural parts of the conventional image reader will be described with reference to FIG. 7. The image reader B includes a case 101. A transparent cover 102 and a substrate 103 in the form of an elongated plate are mounted to an upper portion and a lower portion of the case 101, respectively. A light source 104 is mounted at an end of the substrate 103, and a plurality of sensor IC chips 108 are mounted on the substrate 103 to be aligned longitudinally of the substrate 103. A light guide 105, a reflector 106 and a lens array 107, all of which are elongate longitudinally of the case 101, are arranged in the case 101.

The operation of the image reader B will be described below. The light emitted from the light source 104 travels through the light guide 105 while being scattered little by little to the outside of the light guide 105. Thereafter, the light passes through the transparent cover 102 to irradiate the document P. The light reflected at the document P passes through the lens array 107 and converges on a plurality of light receiving elements (not shown) arranged in a sensor IC chip 108. Each of the light receiving elements outputs an electric signal corresponding to the amount of received light. By processing electric signals outputted by the light receiving elements, i.e., image signals, an image corresponding to the document P can be obtained.

With reference to FIG. 8, the structure of the image reader B will be described in more detail. The case 101 includes, at a lower portion thereof, a peripheral wall 101a and a recess 101b provided inward of the peripheral wall 101a. The substrate 10 is fitted into the recess 101b to be mounted to the case 101. The peripheral wall 101a also serves to prevent external light or a foreign matter from entering the case 101 through a gap between the case 101 and the substrate 103.

A connector 109 is provided at one of longitudinally opposite ends of the substrate 103. The connector 109 is used for connecting the substrate 103 to an external device. The connector 109 partially projects out from a longitudinal edge of the substrate 103. The peripheral wall 101a of the case 101 includes a cutout 101d. The cutout 101d is provided for preventing the outwardly-projecting connector 109 from coming into contact with the peripheral wall 101a in mounting the substrate 103 to the case 101.

Generally, the dimension of the cutout 101d is set larger than the minimum dimension required for preventing the connector 109 from coming into contact with the peripheral wall 101a. One of the purposes of this is to reliably prevent the contact between the connector 109 and the peripheral wall 101a, and the other purpose is to make it possible to use various kinds of connectors and make the structural parts of the image reader B be widely usable. Due to this structure, when the substrate 103 is mounted to the case 101, a relatively large gap c1 is defined between the cutout 101d and the connector 109. This gap c1 allows light and foreign matters from outside to enter the case 101. To prevent this, the case 101 further includes a partition wall 101e integrally formed on the case 101, as shown in FIG. 8. The partition wall 101e separates the light receiving elements from the cutout 101d so that light and foreign matters are prevented from coming close to the light receiving elements in the case 101.

Described above is the structure of a conventional image reader. To be described below are problems which occur in actually using an image reader.

Image signals are liable to be influenced by electric noise. The inclusion of noise in image signals deteriorates the image quality. Therefore, in the actual use of the device, it is necessary to take measures to reduce the influence of electric noise.

As one of typical countermeasures against noise, a conductive housing can be employed as a housing for surrounding the electric circuit and the system, and the housing is connected to the ground wiring. With this method, the housing is prevented from being charged, which may lead to the enhancement of resistance to noise.

FIG. 9 shows the image reader B to which the above-described countermeasure against noise is applied. The case 101 is conductive and made of polycarbonate containing carbon fiber, for example. Electrodes 110A and 110B are provided on an upper surface of the substrate 103 and a lower end surface of the partition wall 101e of the case 101, respectively. For instance, these electrodes are formed by applying silver paste having excellent conductivity to predetermined portions. The electrode 110A is connected to a ground wiring (not shown) provided on the substrate 103. A solder bump 111 is provided on the electrode 110A. When the substrate 103 is mounted to the case 101, the solder bump 111 comes into contact with the electrode 110B.

Generally, much resin components are deposited on a surface of the case 101. Even when such a surface of the case is brought into contact with a solder bump, it is difficult to obtain sufficient conduction. Unlike this, in the example shown in FIG. 9, the highly conductive electrode 110B is provided on a case surface, and the size of the electrode 110B is considerably larger than that necessary for coming into contact with the solder bump 111. With this structure, the case 101 is electrically connected to the substrate 103 via the electrode 110B, the solder bump 111 and the electrode 110A and hence connected to ground. Therefore, the case 101 is not charged excessively, so that inclusion of noise in the image signals can be prevented.

However, the above-described countermeasure against noise causes another problem, i.e., causes silver particles to appear as dust. Specifically, for example, the silver particles contained in the electrode 110B may appear as dust due to the rubbing between the solder bump 111 and the electrode 110B. Further, the electrodes 110A and 110B may loose adhesion due to the volatilization of a solvent, whereby silver particles naturally appear from the surfaces of the electrode 110A and 110B as dust. When the dust appeared in this way scatters and adheres to the light receiving elements, the light receiving elements cannot properly detect light, which leads to the degradation of the image reading quality.

DISCLOSURE OF THE INVENTION

An object of the present invention, which is conceived under the above-described circumstances, is to provide an image reader which includes a conductive case and an electrode formed at the case and which is capable of obtaining a proper read image by properly preventing the charging of the case and the adhesion of conductive particles to the light receiving elements.

To solve the above-described problems, the present invention takes the following technical measures.

According to a first aspect of the present invention, there is provided an image reader comprising a conductive case, a substrate mounted to the bottom of the case, a plurality of light receiving elements for image reading accommodated in the case and provided on the substrate, a first electrode formed at the case, a second electrode provided on the substrate, and a conductive contact member. The conductive contact member is held in contact with the first electrode so as to cover a surface of the first electrode and also in contact with the second electrode. The conductive contact member electrically connects the first and the second electrodes to each other while causing the first and the second electrodes to be spacially separate from each other.

With this structure, it is possible to prevent conductive particles from appearing as dust from the first electrode, because the conductive contact member is held in contact with the first electrode so as to cover the first electrode. Further, with this structure, even when conductive particles of the first electrode appear as dust due to any reason, the conductive particles do not scatter, because the surface of the first electrode is covered by the conductive contact member. Therefore, according to the present invention, conductive particles of the first electrode are prevented from adhering to the light receiving elements provided on the substrate, so that a proper read image can be obtained.

Further, with the above-described structure, excessive charging of the case and inclusion of noise in the image signals can be avoided. This is because the first electrode formed at the case surface and the second electrode provided on the substrate are electrically connected to each other via the conductive contact member so that the case is connected to ground.

Preferably, the case is formed with an accommodation recess for accommodating the conductive contact member. More preferably, the accommodation recess has a size which makes it possible to automatically position the conductive contact member relative to the case. With this structure, the conductive contact member can be easily mounted to the case.

Preferably, the first electrode is formed on a bottom surface of the accommodation recess.

With this structure, conduction can be reliably provided between the first electrode and the second electrode. This is because, when the substrate is mounted to the case, the conductive contact member is compressed while being sandwiched from above and below between the first electrode (provided at the bottom surface of the accommodation recess) and the second electrode (provided on the substrate).

Preferably, the conductive contact member is made of conductive rubber.

With this structure, conduction can be reliably provided between the first electrode and the second electrode, because a relatively large contact area can be provided between the conductive contact member and the first electrode, and the conductive contact member and the second electrode. Since the conductive contact member is elastic, the conductive contact member can come into surface contact with the first and the second electrodes.

Preferably, the conductive contact member includes an upper surface and a lower surface, and at least one of the two surfaces is irregular.

With this structure, even when the thickness of the first electrode or the second electrode is non-uniform, the conductive contact member can absorb the nonuniformity. Specifically, projections which form the irregularities of the surface of the conductive contact member incline correspondingly to the non-uniform thickness of the electrode. As a result, such a state in which the substrate is mounted to the case while being spaced from the case can be avoided.

Preferably, a projection is formed at the bottom surface of the accommodation recess.

This structure is advantageous for providing conduction between the case and the electrode, because the conductive material contained in the case such as carbon fiber is liable to be exposed at a surface of the projection.

Preferably, the accommodation recess is separated, by a partition wall, from an inner region of the case in which the light receiving elements are accommodated.

With this structure, a proper read image can be obtained, because conductive particles of the first electrode are reliably prevented from adhering to the light receiving elements. The first electrode formed on the bottom surface of the accommodation recess is separated from the inner region of the case in which light receiving elements are accommodated.

Preferably, the conductive contact member is elastically deformable.

Other features and advantages of the present invention will become clearer from the description of the embodiments of the present invention given below.

BEST MODE FOR CARRYING OUT THE INVENTION

Preferred embodiments of the present invention will be described below with reference to the accompanying drawings.

Figure 1:
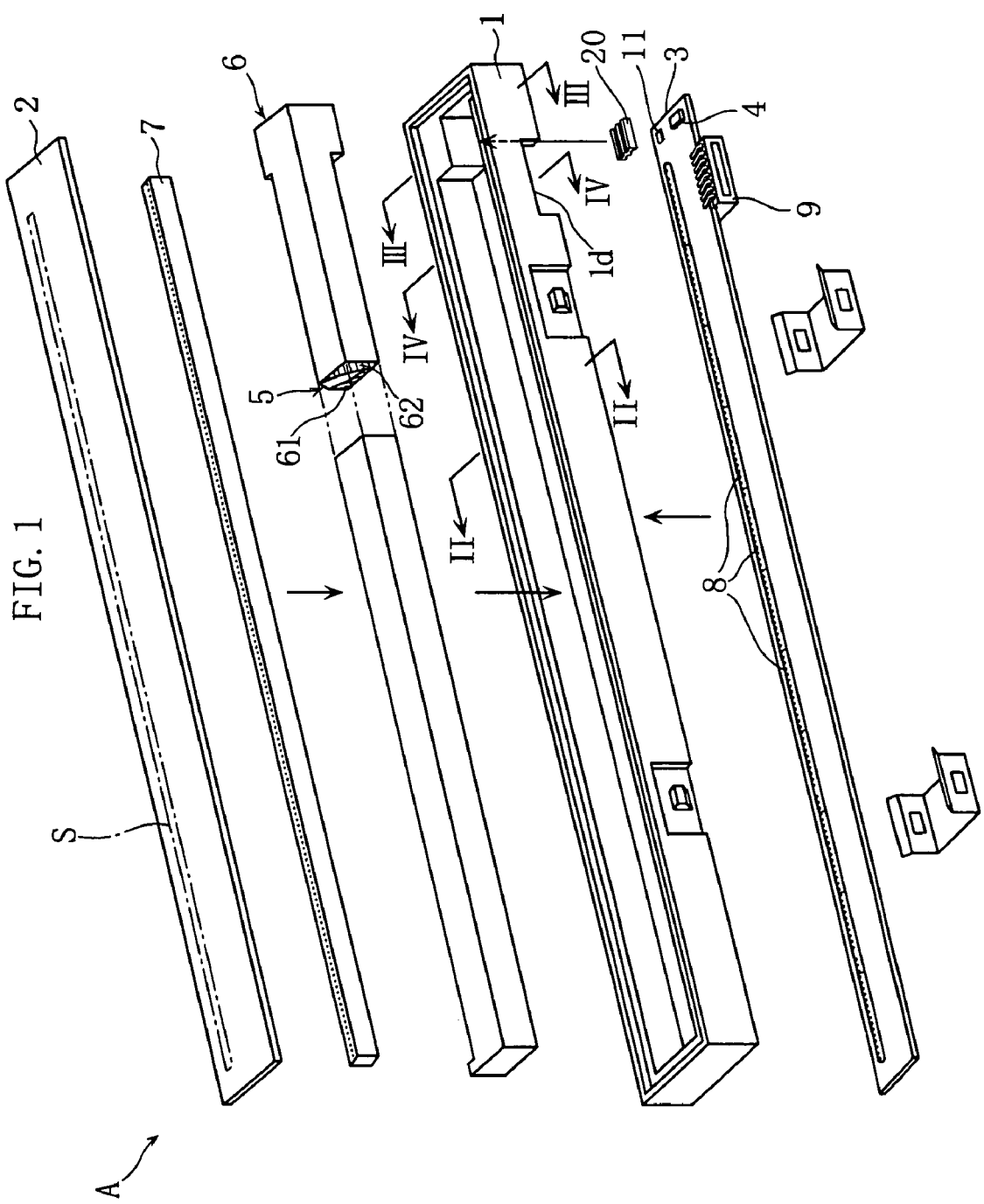
FIG. 1 is an exploded perspective view showing an example of image reader according to the present invention.
Figure 2:
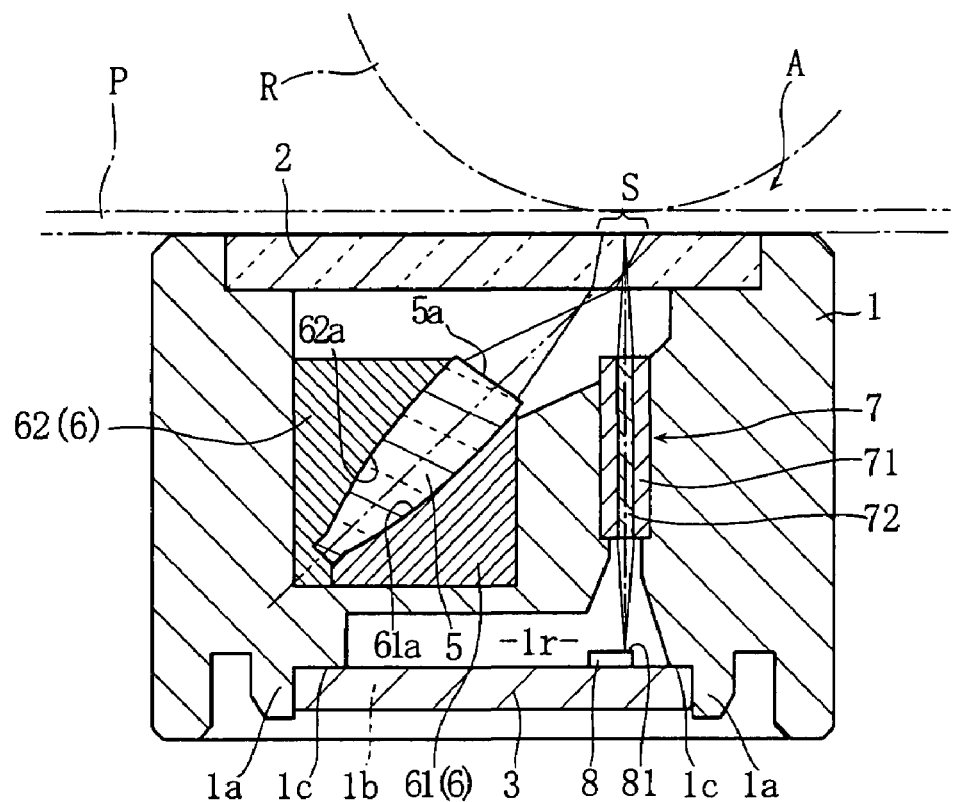
FIG. 2 is a sectional view taken along lines II-II in FIG. 1.
Figure 3:
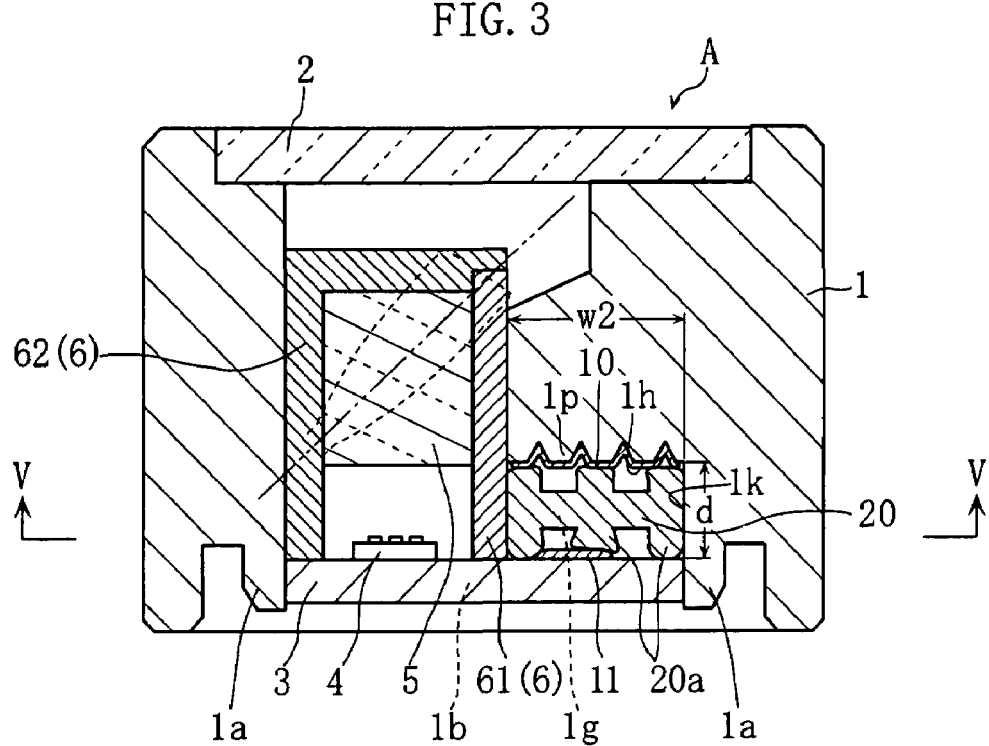
FIG. 3 is a sectional view taken along lines III-III in FIG. 1.

FIGS. 1-5 show an example of image reader according to the present invention. The image reader A of this embodiment can be used as a structural part of a scanner in which a document is transferred by e.g. a platen roller R (See FIG. 2). As shown in FIG. 1, the imager reader A includes a case 1, a transparent cover 2, a substrate 3, a light source 4, a light guide 5, a reflector 6, a lens array 7, a plurality of sensor IC chips 8 and a connector 9. As shown in FIG. 3, the image reader A further includes an electrode 10 as a first electrode, a solder bump 11 as a second electrode, and a conductive contact member 20.

The case 1 is elongate in the primary scanning direction. For instance, the case maybe made of a synthetic resin material obtained by adding about 7 to 10% by weight of carbon fiber to polycarbonate. Because of the use of such a material, the case 1 is conductive.

The transparent cover 2 comprises a glass plate or a synthetic resin plate which is in the form of an elongated rectangle in plan view. The cover 2 is mounted to an upper surface of the case 1 to close the upper opening of the case 1.

The lens array 7 includes a holder 71 made of synthetic resin and elongated in the primary scanning direction, and a plurality of lenses 72 arranged in a row in the holder. For instance, each of the lenses 72 may comprise a rod lens. The lens array 7 is so mounted to the case 1 as to face the lower surface of the transparent cover 2.

The light source 4 includes e.g. three kinds of LED chips for emitting red light, green light and blue light, respectively, which are collectively resin-packaged. The light source 4 is mounted on the substrate 3 at one of longitudinally opposite ends of the substrate.

The light guide 5 is elongate in the longitudinal direction of the case 1 and efficiently guides the light emitted from the light source 4 to the entire area of a document read region S of the transparent cover 2. The light guide 5 may be made of a transparent acrylic resin such as PMMA or other materials having excellent light transmittance. All the surfaces of the light guide 5 are made as a mirror surface. The lower surface of the light guide 5 is formed with a plurality of recesses (not shown) spaced from each other by a predetermined distance in the longitudinal direction. When the light traveling through the liquid guide 5 impinges on the recesses, the light is scattered in various directions. As a result, the light is emitted from a light emitting surface 5a toward the image read region S.

The reflector 6 comprises a first member 61 and a second member 62, both of which have an overall length generally corresponding to the overall length of the light guide 5. The first member 61 and the second member 62 of the reflector hold the light guide 5 therebetween. The reflector 6 is mounted to the case 1 while integrally holding the light guide 5. The first and the second members 61 and 62 may be made of white resin, for example, and have a high reflectivity. Therefore, the light emitted from the light source 4 is prevented from leaking to the outside of the light guide 5. The first and the second members 61 and 62 have reflective surfaces 61a and 62a, respectively. The reflective surfaces are designed to fit to the light guide 5. The light emitted from the light source 4 travels while repeating total reflection at the mirror surfaces of the light guide 5 or reflection at the reflective surfaces 61a, 62a and is then emitted from the light emitting surface 5a of the light guide 5 to irradiate the document read region S.

The plurality of sensor IC chips 8 are mounted on the substrate 3 to be aligned in the primary scanning direction (longitudinal direction of the substrate 3) in contact with each other. Each of the sensor IC chips 8 comprises a semiconductor chip including an integrated circuit provided with a plurality of light receiving elements 81. When the substrate 3 is mounted to the bottom of the case 1, the sensor IC chips 8 are accommodated in an inner region 1r of the case 1. In this state, the light receiving elements 81 are located at positions at which the light passed through the lens array 7 can be received. Each of the light receiving elements 81 has a photoelectric conversion function. Thus, when each of the light receiving elements 81 receives light at a predetermined light receiving surface, the light receiving element outputs a signal of the level corresponding to the amount of received light.

The substrate 3 is in the form of a strip made of ceramic material. The connector 9 for connecting the substrate 3 to an appropriate external device is provided at one of longitudinally opposite ends of the substrate. On the substrate 3, a wiring (not shown) for electrically connecting the connector 9 to the light source 4 and the sensor IC chips 8 are provided.

The power supply to the light source 4 and signal input and output with respect to the sensor IC chips 8 are performed through the wiring and the connector 9.

As shown in FIG. 2, the substrate 3 is so mounted to the case l as to close the lower opening of the case 1. Specifically, a lower portion of the case 1 is formed with a downwardly projecting peripheral wall 1a, and the substrate 3 is mounted to the case 1 by fitting into a recess 1b defined inside of the peripheral wall 1a. The recess 1b has a flat bottom surface 1c. By holding the substrate 3 in contact with the bottom surface 1c, external light or dust are prevented from passing between the case 1 and the substrate 3 to reach the inner region 1r of the case 1.

Figure 4:
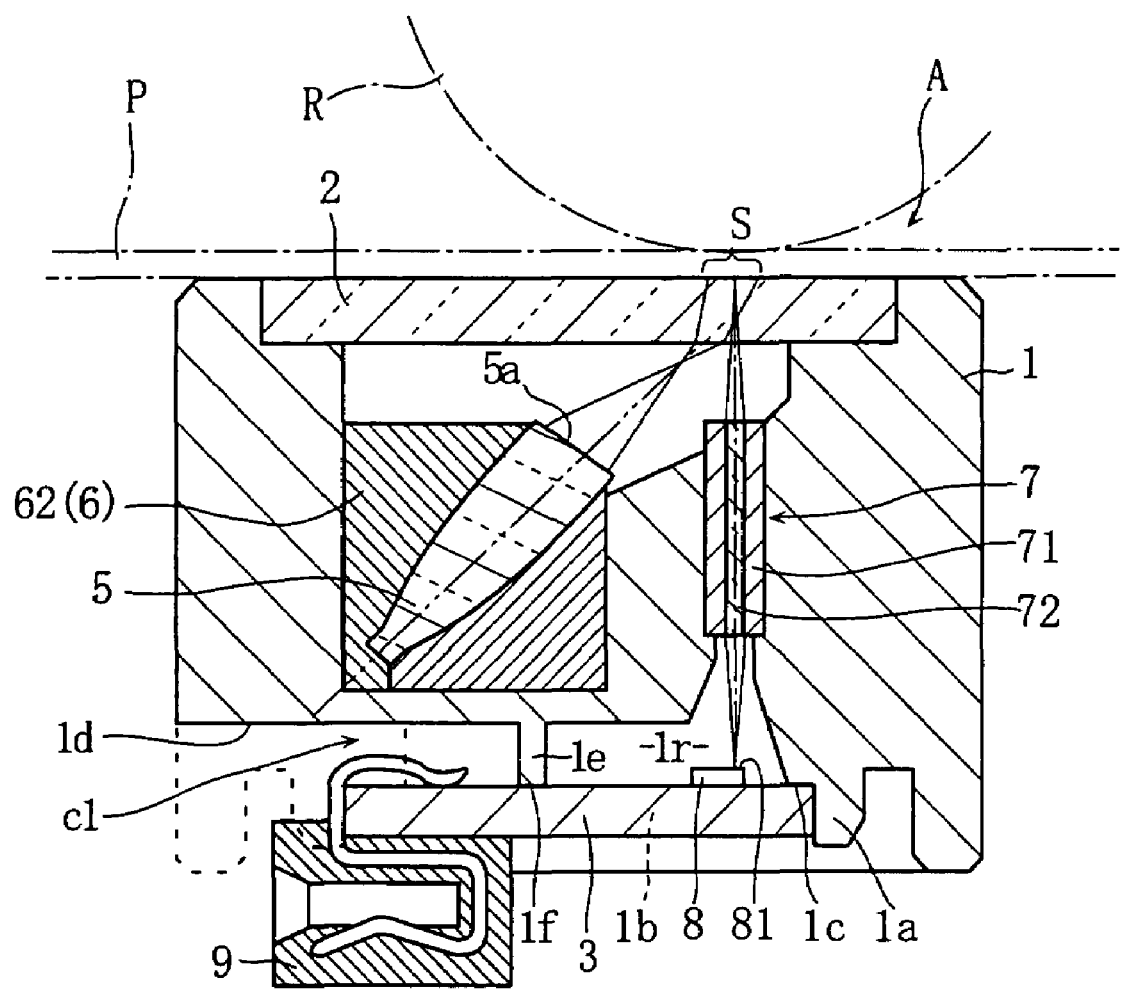
FIG. 4 is a sectional view taken along lines IV-IV in FIG. 1.
Figure 5:
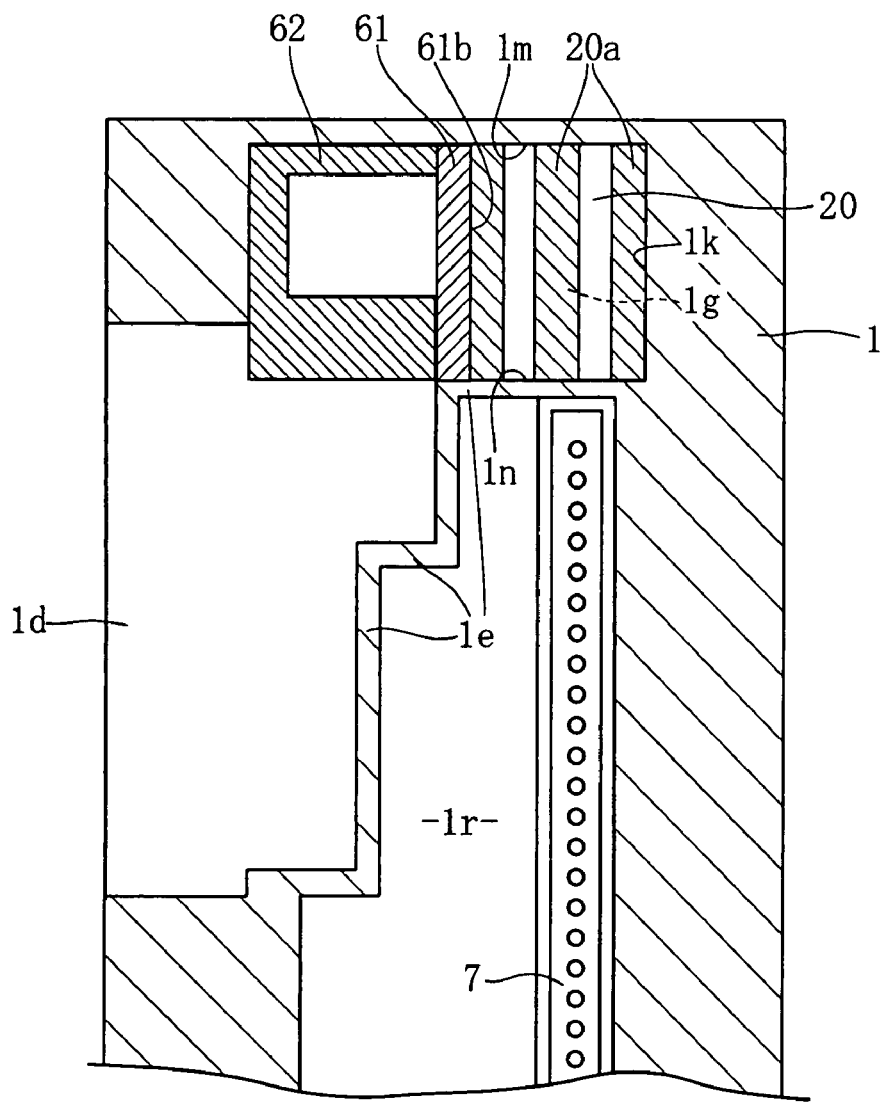
FIG. 5 is a sectional view (showing a principal portion) taken along lines V-V in FIG. 3.

As shown in FIGS. 1, 4 and 5, the peripheral wall 1a is formed with a cutout 1d. The cutout is provided at a location corresponding to the connector 9. The provision of the cutout 1d prevents the connector 9 from coming into contact with the peripheral wall 1a in mounting the substrate 3 to the case 1. The dimension of the cutout 1d is set larger than the minimum dimension required for preventing the connector 9 from coming into contact with the peripheral wall 1a. Therefore, as shown in FIG. 4, when the substrate 3 is mounted to the case 1, a relatively large gap c1 is defined between the cutout 1d and the connector 9.

As shown in FIG. 4, the case 1 further includes a partition wall 1e integrally formed on the case 1. The partition wall 1e separates the light receiving elements from the cutout 1d. The partition wall 1e has a flat lower end surface 1f which is flush with the bottom surface 1c of the recess 1b.

An insulating film (not shown) is formed on the obverse surface of the substrate 1 at portions contacting the case 1 (the portion facing the bottom surface 1c of the recess 1b and the portion facing the lower end surface 1f of the partition wall 1e shown in FIG. 2). The insulating film comprises a resist film made of an epoxy resin containing a silica-based inorganic filler in a solvent.

As shown in FIGS. 3 and 5, a rectangular accommodation recess 1g for accommodating the conductive contact member 20 is formed at the bottom of the case 1 at one of longitudinally opposite ends of the case 1. The accommodation recess 1g is surrounded by a bottom surface 1h and four side surfaces 1k, 1m, in and 61b and partitioned from the inner region 1r by the partition wall 1e. The side surface 61b is a surface of the first member 61 of the reflector 6. In this way, a side surface surrounding the accommodation space in this embodiment comprises a surface of a structural part other than the case 1. However, the present invention is not limited to such a structure. For instance, all the side surfaces for surrounding the accommodation space may comprise surfaces of the case 1.

As shown in FIG. 3, the bottom surface 1h is formed with a plurality of projections 1p extending longitudinally of the case 1. The electrode 10 is formed on the bottom surface 1h. The electrode 10 may be made by applying a silver paste, for example. This silver paste may be formed by mixing silver particles with resin binder and further mixing this with a viscous medium containing an organic resin in a solvent.

Figure 6:
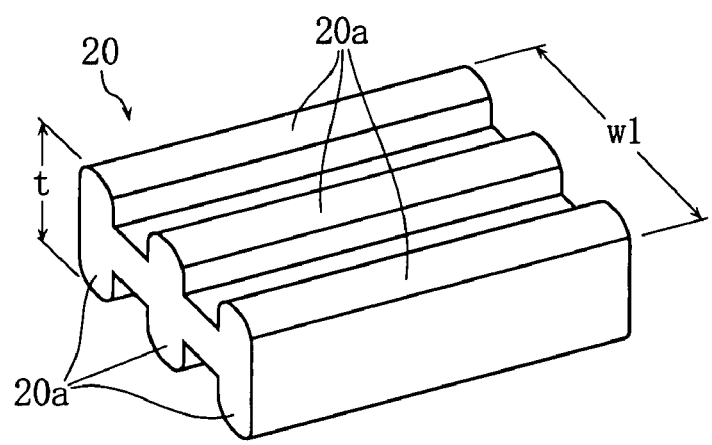
FIG. 6 is a perspective view showing an example of conductive contact member.
Figure 7:
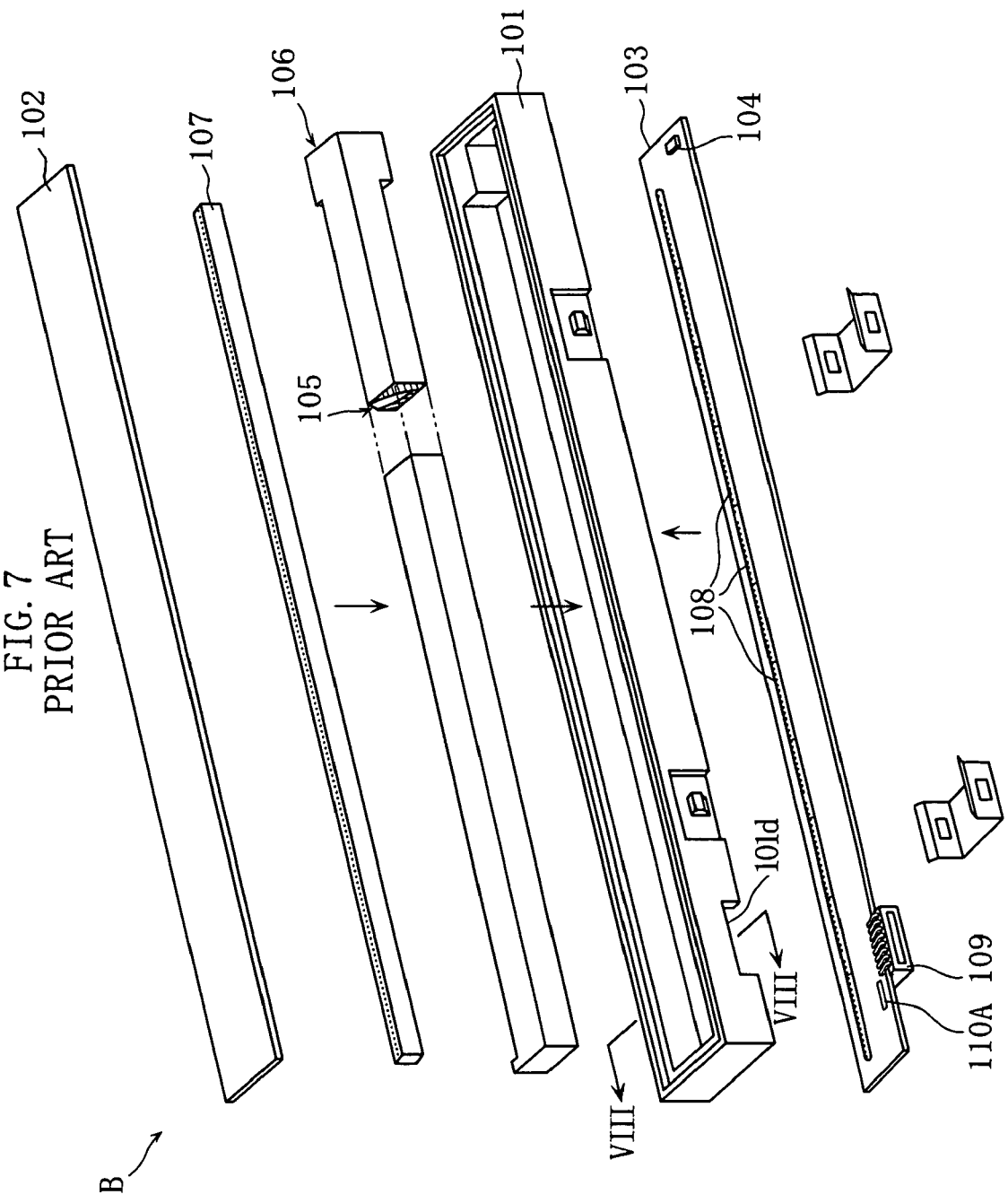
FIG. 7 is an exploded perspective view showing an example of conventional image reader.
Figure 8:
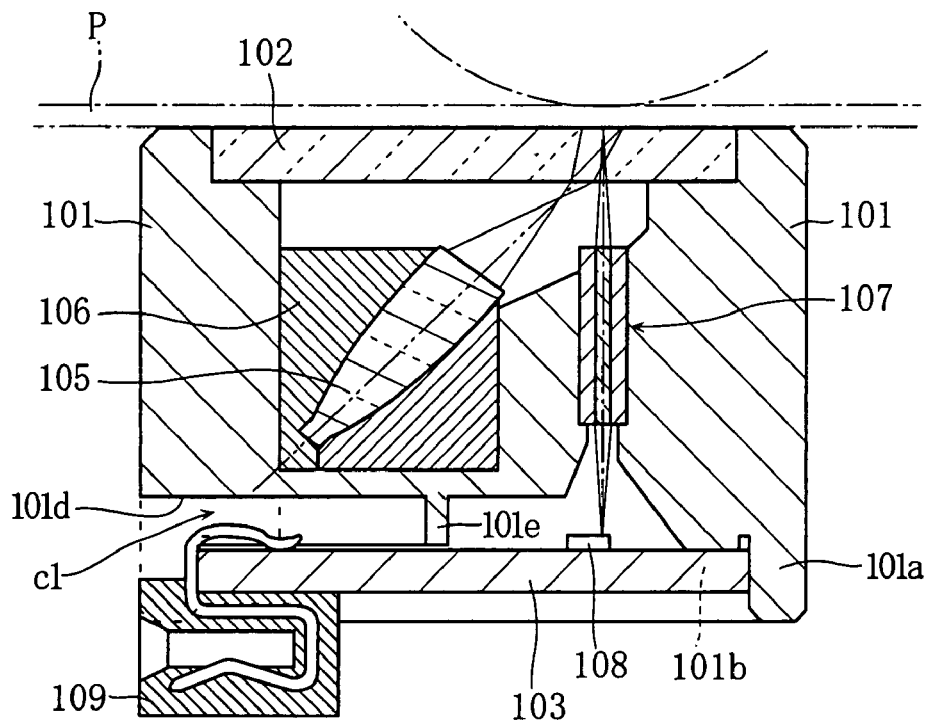
FIG. 8 is a sectional view taken along lines VIII-VIII in FIG. 7.
Figure 9:
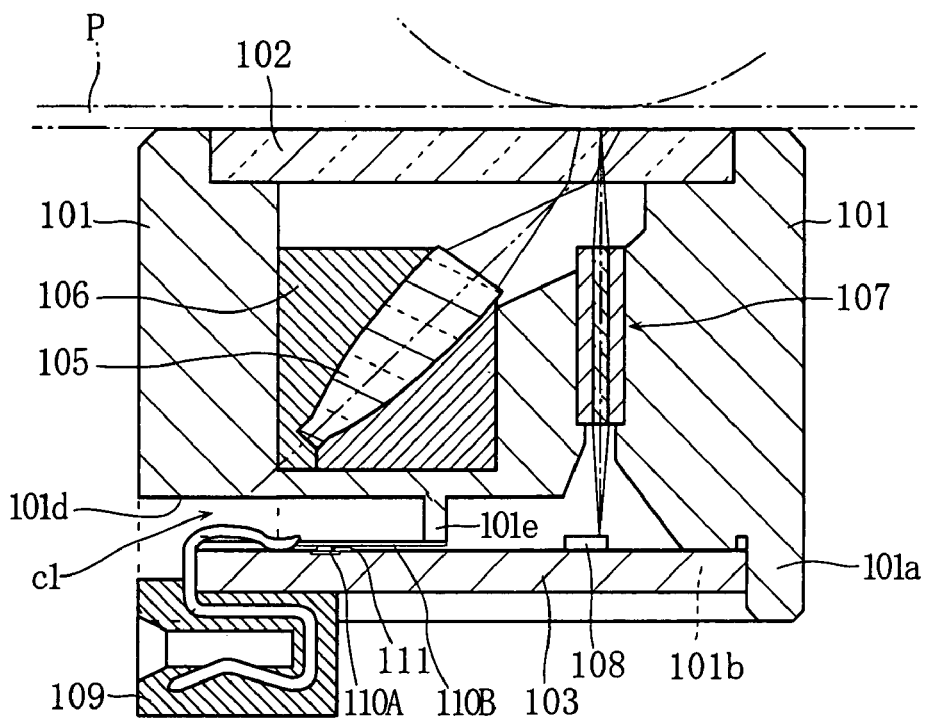
FIG. 9 is a sectional view showing another example of conventional image reader.

The conductive contact member 20 is accommodated in the accommodation recess 1g of the case 1. The conductive contact member 20 may be made of silicone rubber containing about 20 to 60 wt % of carbon fiber. That is, the conductive contact member 20 is made of so-called conductive rubber having conductivity. As shown in FIG. 6, the conductive contact member 20 is in the form of a rectangular parallelepiped formed with a plurality of projections 20a at each of an upper and a lower surfaces thereof to be symmetrical with respect to the horizontal. The thickness t of the conductive contact member 20 is slightly larger than the depth d of the accommodation recess 1g. The width w1 of the conductive contact member 20 is slightly larger than the width w2 of the accommodation recess 1g.

As shown in FIG. 3, the solder bump 11 is formed on the substrate 3. The solder bump 11 is formed at a position facing the accommodation space 1g and projects upward. The solder bump 11 is connected to the wiring on the substrate 3 and is set to the ground potential. When the substrate 3 is mounted to the case 1, the conductive contact member 20 is sandwiched between and pressed by the bottom surface 1h of the accommodation recess 1g and the obverse surface of the substrate 3 or the solder bump 11. Therefore, the conductive contact member 20 is brought into surface contact with the electrode 10 on the bottom surface 1h and with the solder bump 11. As a result, the case 1 is electrically connected to the substrate 3 via the electrode 10, the conductive contact member 20 and the solder bump 11 to be connected to ground.

The operation of the image reader A will be described below with reference to FIG. 1.

First, the light emitted from the light source 4 is guided into the light guide 5 and repeats total reflection at various portions of the surfaces of the light guide 5 or reflection at the reflective surfaces 61a and 62a of the reflector 6. After traveling through the light guide 5 in this way, the light passes through the light emitting surface 5a of the light guide 5 and impinges on the document read region S. The light reflected at the surface of the document P on the image read region S passes through the lenses 71 of the lens array 7 and converges on each of the light receiving elements 81 in the sensor IC chips 8. In this way, the image of the document P is formed on the light receiving elements 81. The image signals outputted from the light receiving elements 81 are processed, whereby the read image is obtained.

In this embodiment, unlike the conventional structure, the electrode 10 provided on the case 1 does not come into contact with the solder bump 11 provided on the substrate 3, and the conductive contact member 20 intervenes between the electrode 10 and the solder bump 11. Therefore, the electrode 10 and the solder bump 11 do not rub against each other, so that the silver particles contained in the electrode 10 are prevented from appearing as dust.

Moreover, since the obverse surface of the electrode 10 (lower surface in FIG. 3) is covered by the conductive contact member 20, it is also possible to prevent the scattering of silver particles from the surface of the electrode 10 due to the volatilization of the solvent contained in the silver paste of the electrode 10 and the deterioration of adhesion. As a result, it is possible to properly prevent silver particles from adhering to the light receiving elements 81 provided on the substrate 3, so that a proper read image can be obtained.

Further, as noted above, since the case 1 is connected to ground, excessive charging of the case 1 is prevented, so that inclusion of noise in image signals is prevented properly.

In this embodiment, due to the provision of the accommodation recess 1g in the case 1, the conductive contact member 20 can be properly positioned relative to the case 1. Therefore, the mounting of the conductive contact member 20 to the case 1 is easy. Further, when the substrate 3 is mounted to the case 1, the conductive contact member 20 is sandwiched between and pressed from above and below by the bottom surface 1h of the accommodation recess 1g and the solder bump 11. Therefore, conduction is reliably established between the electrode 10 on the bottom surface 1h of the accommodation recess 1g and the solder bump 11.

Moreover, the conductive contact member 20, which has elasticity, can come into surface contact with the electrode 10 and the solder bump 11 by being sandwiched between and pressed by the bottom surface 1h of the accommodation recess 1g and the surface of the substrate 3 or the solder bump 11. Therefore, the contact area between the conductive contact member 20 and the electrode 10 or the solder bump 11 is increased. This further ensures the conduction between the electrode 10 and the solder bump 11 via the conductive contact member 20.

The upper and the lower surfaces of the conductive contact member 20 are irregular. Therefore, in mounting the substrate 3 to the case 1, the projections 20a at the upper and the lower surfaces are compressed and inclined so that the obverse surface of the substrate 3 can be brought into contact with the bottom surface 1c of the case 1 and the lower end surface 1f of the partition wall 1. Therefore, even when the thickness of the solder bump 11 or the electrode 10 is non-uniform, the non-uniformity can be absorbed by the inclination of the projections 20a. Therefore, such a state in which the substrate 3 is mounted to the case 1 while being spaced from the case 1 can be prevented, so that the quality of the read image can be enhanced. As noted before, the conductive contact member 20 is symmetrical with respect to the horizontal. Therefore, in mounting the conductive contact member 20 to the case 1, the orientation of the upper and the lower surfaces of the conductive contact member 20 does not need to be considered, which is convenient.

As noted before, an insulating film is formed at portions of the substrate 3 which are to come into contact with the case 1. Therefore, the case 1 is prevented from being unduly connected electrically to the conductive portion of the substrate 3, so that malfunction of the image reader A is properly prevented.

In this embodiment, the partition wall 1e separates the accommodation recess 1g from the inner region 1r of the case 1 in which the light receiving elements 81 are accommodated. That is, the electrode 10 formed on the bottom surface 1h of the accommodation recess 1g is separated by the partition wall 1e from the inner region 1r in which the light receiving elements are accommodated. Therefore, conductive particles of the electrode 10 are more reliably prevented from adhering to the light receiving elements 81, which is preferable to obtain a proper read image.

In this embodiment, since the projections 1p are formed at the bottom surface 1h of the accommodation recess 1g, carbon fiber contained in the case 1 is liable to be exposed at the surfaces of the projections 1b. This is advantageous for ensuring electrical conduction between the case 1 and the electrode 10.

Although the specific embodiments of the present invention are described above, the present invention is not limited thereto and may be varied in many ways without departing from the spirit of the invention.

Although the conductive contact member 20 is accommodated in the accommodation recess 1g in the foregoing embodiment, the present invention is not limited to this structure. A structure different from that of the foregoing embodiment may be employed as long as the conductive member comes into contact with the first electrode so as to cover the surface of the first electrode and also comes into contact with the second electrode.

Although the accommodation recess 1g in the foregoing embodiment is rectangular in bottom view, the configuration of the accommodation recess is not limited to this. The accommodation recess may have a configuration different from that of the foregoing embodiment such as a circular shape in bottom view.

The material and configuration of the conductive contact member of the present invention is not limited to the foregoing embodiment and may be varied appropriately.

Although the image reader A in the foregoing embodiment is an example to be used as mounted in a scanner in which a document is transferred by a platen roller, the present invention is not limited thereto. The image reader of the present invention can be used widely for various devices in which image reading is to be performed, such as a so-called flatbed scanner or handy scanner.

The invention claimed is:

1. An image reader comprising:
   a conductive case;
   a substrate attached to a bottom of the case;
   a plurality of light receiving elements for image reading accommodated in the case and provided on the substrate;
   a first electrode formed directly on the case;
   a second electrode provided on the substrate; and
   a conductive contact member;
   wherein the conductive contact member is held in contact with the first electrode to cover a surface of the first electrode and also in contact with the second electrode to electrically connect the conductive case to the substrate via the first electrode, the conductive contact member and the second electrode connected to ground while causing the first and the second electrodes to be spatially separate from each other.

2. The image reader according to claim 1, wherein the case is formed with an accommodation recess for accommodating the conductive contact member, the accommodation recess being separated by a partition wall from an inner region of the case that receives the plurality of light receiving elements.

3. The image reader according to claim 2, wherein the first electrode is formed at a bottom surface of the accommodation recess.

4. The image reader according to claim 1, wherein the conductive contact member is made of conductive rubber.

5. The image reader according to claim 1, wherein the conductive contact member includes an upper surface and a lower surface, and at least one of the two surfaces is irregular.

6. The image reader according to claim 2, wherein a projection is formed at a bottom surface of the accommodation recess.

7. The image reader according to claim 2, wherein the accommodation recess is separated, by a partition wall, from an inner region of the case in which the light receiving elements are accommodated.

8. The image reader according to claim 1, wherein the conductive contact member is elastically deformable.

9. The image reader according to claim 1, further comprising a light source mounted on the substrate, a light guide for directing light from the light source toward an image reading region, and a reflector housing the light guide, wherein the conductive contact member is also held in direct contact with the reflector.

* * * * *